US012780635B2

(12) United States Patent
Hong

(10) Patent No.: US 12,780,635 B2
(45) Date of Patent: Nov. 3, 2026

(54) INDUSTRIAL VEHICLE SAFETY SYSTEM AND CONTROL METHOD THEREOF

(71) Applicant: DOOSAN BOBCAT KOREA CO., LTD., Incheon (KR)

(72) Inventor: Woobyeong Hong, Incheon (KR)

(73) Assignee: DOOSAN BOBCAT KOREA CO., LTD., Incheon (KR)

( * ) Notice: Subject to any disclaimer, the term of this patent is extended or adjusted under 35 U.S.C. 154(b) by 0 days.

(21) Appl. No.: 19/217,876

(22) Filed: May 23, 2025

(65) Prior Publication Data

US 2026/0242198 A1 Aug. 20, 2026

(30) Foreign Application Priority Data

Feb. 20, 2025 (KR) ........................ 10-2025-0022403

(51) Int. Cl.
*B66F 17/00* (2006.01)
*B66F 9/075* (2006.01)

(52) U.S. Cl.
CPC ........ *B66F 17/003* (2013.01); *B66F 9/07509* (2013.01); *B66F 9/0759* (2013.01)

(58) Field of Classification Search
CPC ..................................................... B66F 17/003
See application file for complete search history.

(56) References Cited

U.S. PATENT DOCUMENTS

| | | | | |
|---|---|---|---|---|
| 5,156,243 A * | 10/1992 | Aoki | B60K 20/06 | 200/61.54 |
| 2001/0056544 A1* | 12/2001 | Walker | B60R 25/102 | 180/170 |
| 2014/0350811 A1* | 11/2014 | Tamaru | B60W 10/06 | 701/68 |
| 2017/0241544 A1* | 8/2017 | Terai | F16H 61/32 | |
| 2018/0111596 A1* | 4/2018 | Kim | F02N 11/103 | |
| 2018/0319379 A1* | 11/2018 | Armstrong | B60T 7/14 | |

FOREIGN PATENT DOCUMENTS

| | | |
|---|---|---|
| JP | 2000309256 A | 11/2000 |
| JP | 2008179465 A | 8/2008 |
| KR | 20070067758 A | 6/2007 |

OTHER PUBLICATIONS

Extended European Search report in EP Application No. 25180720.2, issued on Nov. 19, 2025.

* cited by examiner

*Primary Examiner* — John Kwon
(74) *Attorney, Agent, or Firm* — Ladas & Parry, LLP

(57) ABSTRACT

An industrial vehicle safety system and a control method thereof are disclosed. An industrial vehicle safety system according to one aspect of the present disclosure includes a sensor module that senses or detects at least one of a traveling speed, a load capacity, and whether a driver has left his/her seat of an industrial vehicle, a forward/reverse lever of the industrial vehicle operated by the driver, a pressure valve that controls hydraulic pressure provided to a brake device of the industrial vehicle in response to operation of the forward/reverse lever, and a control unit that controls the pressure valve based on a signal output from the sensor module and the operation of the forward/reverse lever.

10 Claims, 6 Drawing Sheets

[FIG. 1]
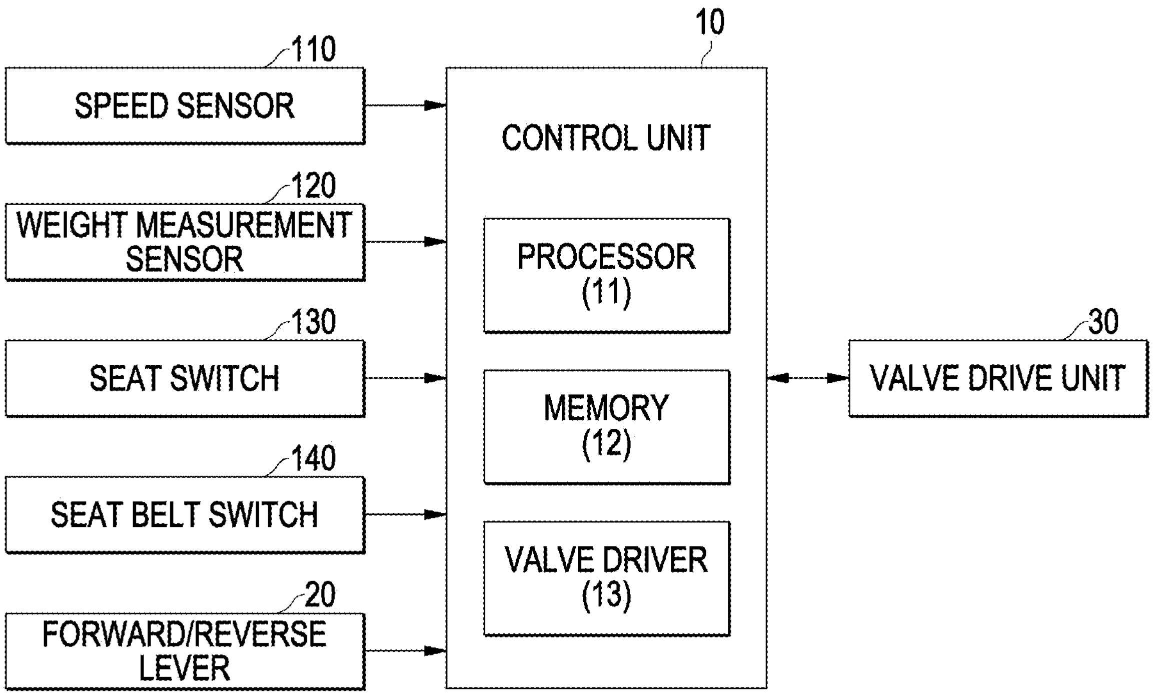

[FIG. 2]
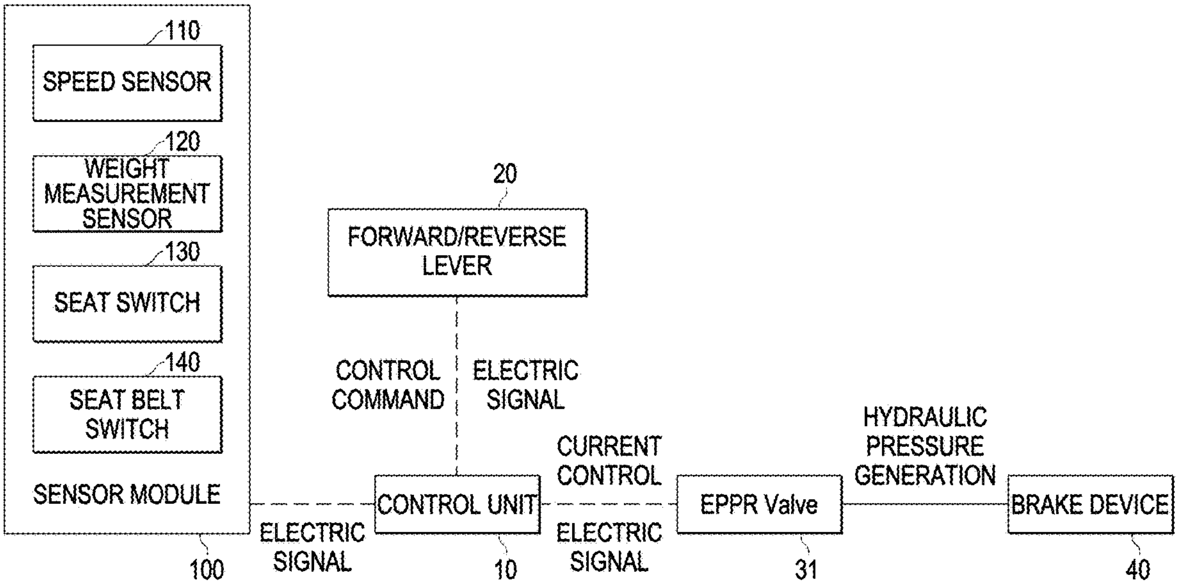

[FIG. 3]
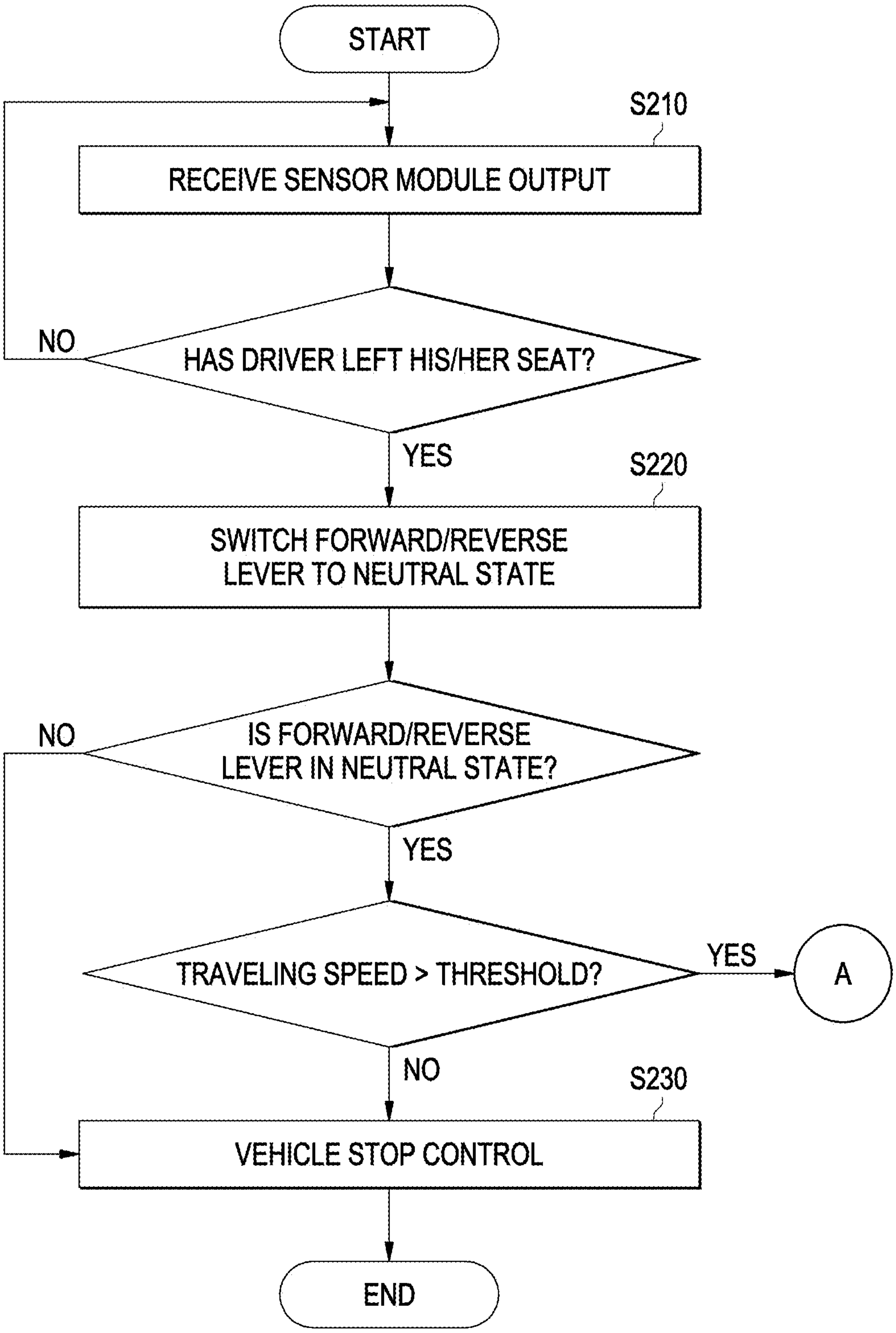

[FIG. 4]
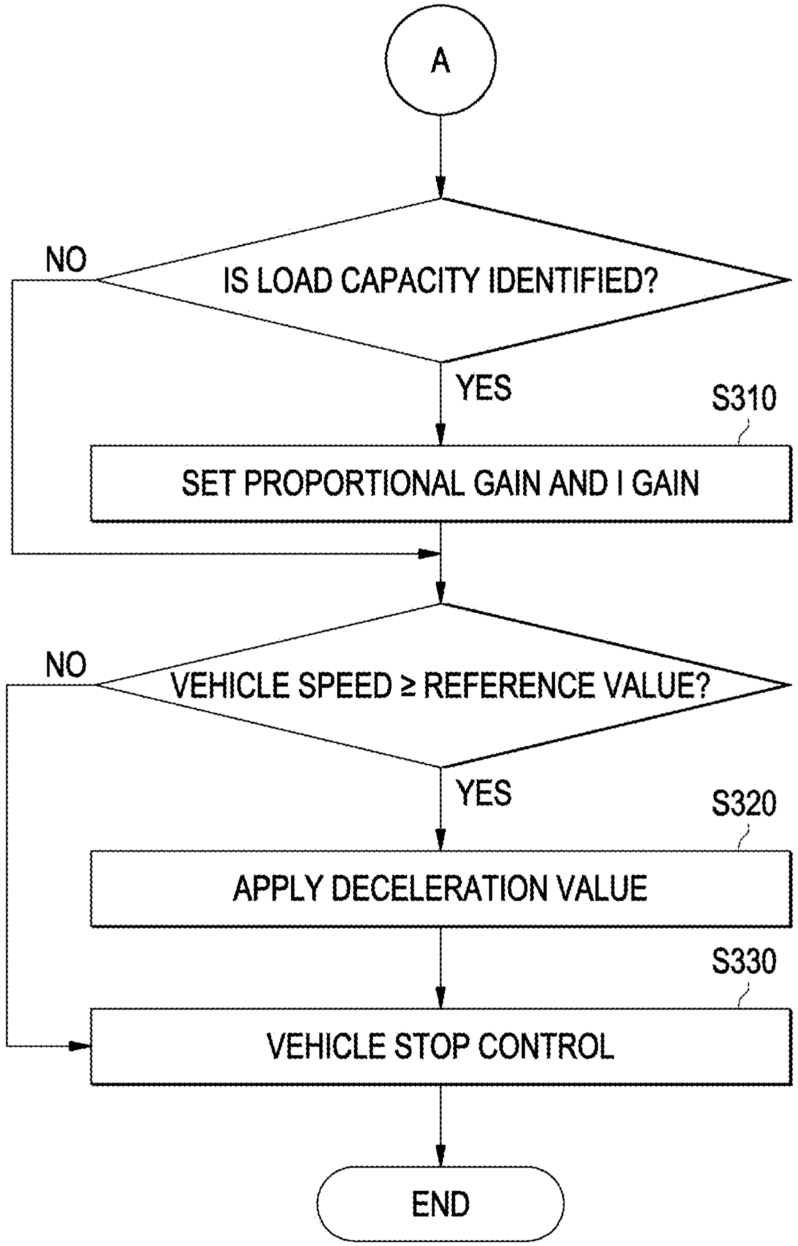

[FIG. 5]

| CURRENT(mA) / PRESSURE(bar) | ~199 / ~3.4 | 200 ~ 600 / 3.5 ~ 5.5 | 601~ / 5.6~ |
|---|---|---|---|
| CONTROL SECTION | VEHICLE STOP | VEHICLE SPEED DECREASE | NOT CONTROLLED |

[FIG. 6]

| LOAD CAPACITY (RATED LOAD) | ~9% | 10% ~ 50% | 51% ~ 90% | 91%~ |
|---|---|---|---|---|
| PROPORTIONAL GAIN | 0.5 | 0.4 | 0.3 | 0.2 |

INDUSTRIAL VEHICLE SAFETY SYSTEM AND CONTROL METHOD THEREOF

CROSS-REFERENCE TO RELATED APPLICATIONS

This application claims the priority of Korean Patent Application No. 10-2025-0022403 filed on Feb. 20, 2025, in the Korean Intellectual Property Office, the disclosure of which is incorporated herein by reference.

BACKGROUND

Field

The present disclosure relates to an industrial vehicle safety system and a control method thereof.

Description of the Related Art

Forklifts, which are used to transport heavy cargo in industrial sites, are mainly used in spaces such as warehouses where the cargo is loaded. The forklifts are usually operated with cargo loaded in order to lift heavy cargo to a desired location or to transport cargo within a designated area. The forklift has a vertical mast that may be extended and contracted in two stages at the front of the vehicle, and two forks on the left and right are interlocked the vertical mast, and the cargo is transported by pushing the forks under the cargo to lift the cargo.

Meanwhile, the forklift may increase speed unintentionally regardless of a driver's intention, and especially when the forklift is set to forced neutral on a ramp, the forklift may slip due to gravity in a state where the cargo is loaded and increase speed. This unintentional increase in speed may cause a very dangerous situation for the driver and workers in industrial sites.

To prevent these problems, a safety system is needed that may perform a safe stop in response to an unintentional increase in the speed of the forklift.

SUMMARY

One aspect of the disclosed disclosure is to provide an industrial vehicle safety system and a control method thereof that controls the pressure of a parking brake through electro-hydraulic proportional pressure reducing valve (EPPR Valve) control in an unintentional speed increase situation, and safely stops the vehicle by decelerating the vehicle according to the weight of the load to protect the driver and the load.

According to one aspect of the present disclosure, there is provided an industrial vehicle safety system including: a sensor module that senses or detects at least one of a traveling speed, a load capacity, and whether a driver has left his/her seat of an industrial vehicle; a forward/reverse lever of the industrial vehicle operated by the driver; a pressure valve that controls hydraulic pressure provided to a brake device of the industrial vehicle in response to operation of the forward/reverse lever; and a control unit that controls the pressure valve based on a signal output from the sensor module and the operation of the forward/reverse lever, in which the control unit switches the forward/reverse lever to a neutral state when it is confirmed that the driver has left his/her seat based on the signal output from the sensor module and monitors the traveling speed of the industrial vehicle, determines whether a preset pressure control condition is satisfied based on the traveling speed of the industrial vehicle, and adjusts pressure provided to the brake device through the pressure valve based on at least one of a load capacity of cargo loaded on the industrial vehicle and a preset deceleration condition to perform deceleration traveling of the industrial vehicle when it is determined that the pressure control condition is satisfied.

According to one aspect of the present disclosure, the pressure valve may be an electro-hydraulic proportional pressure reducing valve (EPPR valve).

According to one aspect of the present disclosure, the control unit may determine that the pressure control condition is satisfied when the traveling speed of the industrial vehicle exceeds a threshold, and perform current control for the pressure valve based on at least one control section of a first section corresponding to stop control, a second section corresponding to deceleration, and a third section corresponding to non-control, which are preset according to a current and pressure range, and monitor the current input to the pressure valve and a vehicle speed of the industrial vehicle.

According to one aspect of the present disclosure, when the load capacity of the cargo loaded on the industrial vehicle is identified based on the output of the sensor module in a case of performing the current control for the pressure valve, the control unit may perform current proportional-integral-derivative control (current PID control) for the pressure valve based on the load capacity of the cargo loaded on the industrial vehicle and a proportional gain (P gain) for each preset load capacity range.

According to one aspect of the present disclosure, the control unit may control the pressure valve so that the industrial vehicle stops when the traveling speed of the industrial vehicle is less than a preset reference value and control the pressure valve so that the industrial vehicle stops after decelerating based on a preset deceleration value when the traveling speed of the industrial vehicle is equal to or more than the reference value.

According to one aspect of the present disclosure, the control unit may control the pressure valve so that the industrial vehicle stops when the forward/reverse lever is not switched to a neutral state or the traveling speed of the industrial vehicle is equal to or less than a threshold.

According to one aspect of the present disclosure, the sensor module may include a speed sensor that senses or detects the traveling speed of the industrial vehicle, a weight measurement sensor that senses or detects the load capacity of the industrial vehicle, a seat switch that detects whether the driver is seated, and a seat belt switch that detects whether the driver is wearing a seat belt, and the control unit may confirm whether the driver has left his/her seat based on a signal output from the seat switch and a signal output from the seat belt switch.

According to one aspect of the present disclosure, there is provided a control method of an industrial vehicle safety system including a sensor module that senses or detects at least one of a traveling speed, a load capacity, and whether a driver has left his/her seat of an industrial vehicle, a forward/reverse lever of the industrial vehicle operated by the driver, a pressure valve that controls hydraulic pressure provided to a brake device of the industrial vehicle in response to operation of the forward/reverse lever, and a control unit that controls the pressure valve based on a signal output from the sensor module and the operation of the forward/reverse lever, the control method including: receiving a signal output from the sensor module; switching the forward/reverse lever to a neutral state when it is confirmed that the driver has left his/her seat based on the signal output from the sensor module and monitors the traveling speed of the industrial vehicle; determining whether a preset pressure control condition is satisfied based on the traveling speed of the industrial vehicle; and adjusting pressure provided to the brake device through the pressure valve based on at least one of a load capacity of cargo loaded on the industrial vehicle and a preset deceleration condition to perform deceleration traveling of the industrial vehicle when it is determined that the pressure control condition is satisfied.

According to one aspect of the present disclosure, the pressure valve may be an electro-hydraulic proportional pressure reducing valve (EPPR valve), and the determining of whether the pressure control condition is satisfied may include determining that the pressure control condition is not satisfied when the forward/reverse lever is not switched to a neutral state or the traveling speed of the industrial vehicle is equal to or less than a threshold and controlling the pressure valve so that the industrial vehicle stops, and determining that the pressure control condition is satisfied when the traveling speed of the industrial vehicle exceeds the threshold, and the performing of deceleration traveling of the industrial vehicle based on the deceleration condition may include controlling the pressure valve so that the industrial vehicle stops based on a control section of a preset current-pressure range for stop control when the traveling speed of the industrial vehicle is less than a preset reference value, performing current control for the pressure valve so that the industrial vehicle decelerates and then stops based on a control section of a preset current-pressure range for each of stop control, deceleration control, and non-control, and a preset deceleration value when the traveling speed of the industrial vehicle is equal to or more than the reference value, and monitoring the current input to the pressure valve and the vehicle speed of the industrial vehicle.

According to one aspect of the present disclosure, the performing of the current control for the pressure value may include, when the load capacity of the cargo loaded on the industrial vehicle is identified based on the output of the sensor module, performing current proportional-integral-derivative control (current PID control) for the pressure valve based on the load capacity of the cargo loaded on the industrial vehicle and a proportional gain for each preset load capacity range.

According to the industrial vehicle safety system and the control method thereof of one aspect of the disclosed disclosure, it is possible to detect an abnormal speed situation and adaptively reduce the vehicle speed according to the weight of a load through current proportional-integral-derivative control (current PID control), thereby preventing a sudden stop and allowing the vehicle to be stopped quickly and stably.

The effects of the present disclosure are not limited to the aforementioned effects, and other effects, which are not mentioned above, will be apparently understood to a person having ordinary skill in the art from the following description.

The objects to be achieved by the present disclosure, the means for achieving the objects, and the effects of the present disclosure described above do not specify essential features of the claims, and, thus, the scope of the claims is not limited to the disclosure of the present disclosure.

BRIEF DESCRIPTION OF DRAWINGS

The above and other aspects, features and other advantages of the present disclosure will be more clearly understood from the following detailed description taken in conjunction with the accompanying drawings, in which:

FIG. 1 is a diagram schematically illustrating the configuration of an industrial vehicle safety system according to one embodiment of the present disclosure.

FIG. 2 is a block diagram of the industrial vehicle safety system according to one embodiment of the present disclosure.

FIG. 3 is a basic flow chart illustrating a control method of the industrial vehicle safety system according to one embodiment of the present disclosure.

FIG. 4 is a flow chart illustrating a control method according to a load capacity of the industrial vehicle safety system according to one embodiment of the present disclosure.

FIG. 5 illustrates an example of a control section according to a current and pressure range according to one embodiment of the present disclosure.

FIG. 6 illustrates an example of a proportional gain for each load capacity range according to one embodiment of the present disclosure.

DETAILED DESCRIPTION OF THE EMBODIMENT

Hereinafter, the Exemplary Embodiment of the present disclosure will be described with reference to the accompanying drawings and exemplary embodiments as follows. Scales of components illustrated in the accompanying drawings are different from the real scales for the purpose of description, so that the scales are not limited to those illustrated in the drawings.

Like reference numerals refer to like elements throughout the specification. This specification does not describe all elements of the embodiments, and any content that is general in the technical field to which the disclosed disclosure belongs or that overlaps between the embodiments is omitted. The terms "part, module, element, block" used in the specification may be implemented in software or hardware, and according to the embodiments, a plurality of "parts, modules, elements, blocks" may be implemented as a single element, or a single "part, module, element, block" may include a plurality of elements.

Throughout the specification, when a part is said to be "connected" to another part, this includes not only direct connection but also indirect connection, and indirect connection includes connection via a wireless communications network.

Additionally, when a part is said to "include" a component, this does not mean that it excludes other components, unless otherwise specifically stated, but rather that it may include other components.

Throughout the specification, when we say that an element is located "on" another element, this includes not only cases where an element is in contact with another element, but also cases where another element exists between the two elements.

The terms first, second, or the like are used to distinguish one component from another, and the components are not limited by the aforementioned terms.

Singular expressions include plural expressions unless the context clearly indicates otherwise.

The identification codes in each step are used for convenience of explanation and do not describe the order of each step. Each step may be performed in a different order than specified unless the context clearly indicates a specific order.

Hereinafter, the operating principle and embodiments of the disclosed disclosure will be described with reference to the attached drawings.

FIG. 1 is a diagram schematically illustrating the configuration of an industrial vehicle safety system according to one embodiment of the present disclosure, and FIG. 2 is a block diagram of an industrial vehicle safety system according to one embodiment of the present disclosure.

As illustrated in FIGS. 1 and 2, a forklift may include a control unit 10, a forward/reverse lever 20, a valve drive unit 30, a brake device 40, and a sensor module 100.

Although not illustrated, the forklift has a configuration in which a hydraulic pump driven by an engine and an operating fluid discharged from the hydraulic pump is transmitted to various working machines through the main hydraulic line. In addition, in the forklift, in order to transmit the power generated by the engine to driving wheels and the driving shaft or axle, a transmission may be provided between the engine and the driving wheels.

The control unit 10 may control a pressure valve described below based on the signal output from the sensor module 100 and the operation of the forward/reverse lever 20.

The forward/reverse lever 20 may be operated by a driver. The forward/reverse lever 20 may be operated according to the driver's will to set the traveling direction and provide an electric signal (for example, a voltage signal or a current signal) (hereinafter, referred to as a "lever signal") corresponding to the position of the lever to the control unit 10.

The valve drive unit 30 may include pressure valves (forward operating valve and reverse operating valve). The pressure valves may be an electro-hydraulic proportional pressure reducing valve (EPPR valve) 31. Referring to FIG. 2, the EPPR Valve 31 may perform a role of controlling clutch hydraulic pressure for operating a forward gear and reverse gear of the brake device 40 described below in response to the operation of the forward/reverse lever 20.

The forklift may shift gears forward or backward as power from the engine passes through the transmission.

The brake device 40 may include the valve drive unit 30, that is, a forward gear and a reverse gear that are rotated by receiving pressure from the forward operating valve and the reverse operating valve.

For example, the driver may operate the forward/reverse lever 20, and the control unit 10 may identify the operation of the forward/reverse lever 20. The control unit 10 may operate the forward operating valve or the reverse operating valve based on the state of the forward/reverse lever 20. When the forward operating valve is operated, the forward gear rotates by the forward clutch in the transmission, and the forklift may move forward. In addition, when the reverse operating valve is operated, the reverse gear rotates by the reverse clutch in the transmission, and the forklift may move backward.

Meanwhile, when both the forward operating valve and the reverse operating valve are opened, the operating fluid flows along the flow path of the drive shaft to operate both the forward clutch pack and the reverse clutch pack, and accordingly, as a result of the operation of the forward clutch and the reverse clutch, both the forward gear and the reverse gear rotate, and the engine power is transmitted in both the forward and reverse directions, which may cause the forklift to stop.

The sensor module 100 may detect or sense at least one of the traveling speed, the load capacity, and whether the driver has left his/her seat of the forklift, and provide an electric signal to the control unit 10.

The sensor module 100 may include at least one of a speed sensor 110, a weight measurement sensor 120, a seat switch 130, and a seat belt switch 140.

The speed sensor 110 is a sensor for detecting or sensing the traveling speed of the forklift, and may be a mechanical or electrical vehicle speed sensor. The speed sensor 110 may output an electric signal (hereinafter referred to as a "speed signal") corresponding to the traveling speed to the control unit 10.

The weight measurement sensor 120 is a sensor that detects or senses the load applied by the cargo loaded on the forklift, and may be a load cell. The weight measurement sensor 120 may output an electric signal (hereinafter referred to as a "load signal") corresponding to the load capacity to the control unit 10.

The seat switch 130 is installed on the driver's seat of the forklift and detects whether the driver is seated in the his/her seat, and may be a pressure sensor. The seat switch 130 may output the electric signal (hereinafter referred to as a "seating signal" corresponding to whether the driver is seated to the control unit 10.

The seat belt switch 140 may be applied in various forms, such as a mechanical switch provided inside the buckle of the seat belt, a pressure sensor type switch combined with the seat switch 130 composed of a pressure sensor, or the like. The seat belt switch 140 may output an electric signal (hereinafter referred to as a "wearing signal") corresponding to whether the driver is wearing the seat belt to the control unit 10.

Although not illustrated, the control unit 10 may include one or more semiconductor elements and may be referred to in various ways, such as an electronic control unit (ECU). Referring to FIG. 1, the control unit 100 may include, for example, one or more processors and/or one or more memories.

The control unit 10 may identify whether the driver has left his/her seat based on the seating signal and the wearing signal.

Referring to FIG. 2, the control unit 10 may control the position of the forward/reverse lever 20 by transmitting a control command to the forward/reverse lever 20.

The control unit 10 may control the pressure provided to the brake device 40 through the valve drive unit 30 based on the speed signal and the load signal. Referring to FIG. 2, the control unit 10 may apply the supply of driving current to the EPPR Valve 31 and control the current value.

Referring to FIG. 1, the control unit 10 may include at least one of a processor 11, a memory 12, and a valve driver 13. The processor 11, the memory 12, and the valve driver 13 are not essential components of the control unit 10, and at least some of them may be omitted.

The processor 11 determines whether the driver has left his/her seat based on the seating signal and the wearing signal, and when it is determined that the driver has left his/her seat, the processor may drive the valve drive unit 30 based on the lever signal, the speed signal, and/or the load signal.

The processor 11 may monitor the driving current provided by the EPPR Valve 31. The processor 11 may monitor the traveling speed based on the speed signal.

Although not illustrated, the processor 11 may include one semiconductor device or may include multiple semiconductors. The processor 11 may include one core or may include multiple cores within the semiconductor device. In addition, the processor 11 may be referred to in various ways, such as a micro controller unit (MCU).

In addition, the control unit 10 and/or the processor 11 may include the memory 12 that stores/remembers a program and data for braking the forklift based on a lever signal, a speed signal, and/or a load signal. The memory 12 may provide the program and data to the processor 11 and may store temporary data generated during an operation of the processor 110. The memory 12 may include, for example, a volatile memory such as a static random access memory (S-RAM) and a dynamic random access memory (D-RAM), and a nonvolatile memory such as an erasable programmable read only memory (EPROM) and a flash memory.

The valve driver 13 may receive the control signal from the processor 11 and provide a driving current to drive the valve drive unit 20 in response to the control signal of the processor 11.

The forklift described above is an example of an industrial vehicle, and of course, the present disclosure may be applied to various industrial vehicles including forklifts.

FIG. 3 is a basic flowchart illustrating a control method of the industrial vehicle safety system according to one embodiment of the present disclosure, FIG. 4 is a flowchart illustrating a control method according to a load capacity of the industrial vehicle safety system according to one embodiment of the present disclosure, FIG. 5 illustrates an example of a control section according to a current and pressure range according to one embodiment of the present disclosure, and FIG. 6 illustrates an example of the proportional gain for each load capacity range according to one embodiment of the present disclosure.

As illustrated in FIG. 3, the control unit 10 may receive a signal output from the sensor module 100 (S210) to confirm that the driver has left his/her seat.

The processor 11 receives the seating signal and the wearing signal, and when it is not identified that the driver is seated and it is not identified that the driver is wearing the seat belt, it may be determined that the driver has left his/her seat.

When it is confirmed that the driver has left his/her seat, the control unit 10 may switch the forward/reverse lever 20 to a neutral state (S220).

When it is confirmed that the driver has left his/her seat, the processor 11 may control the forward/reverse lever 20 to switch to a neutral state by transmitting a control command to the forward/reverse lever 20.

The control unit 10 may monitor the traveling speed of the industrial vehicle. The control unit 10 may determine whether the preset pressure control condition is satisfied based on the traveling speed of the industrial vehicle. The control unit 10 may determine that the pressure control condition is satisfied when the forward/reverse lever 20 is in a neutral state and the traveling speed of the industrial vehicle exceeds a preset threshold. For example, the threshold may be 0.3 km/h.

The processor 11 may receive a speed signal and identify the traveling speed. When the forward/reverse lever 20 is in a neutral state and the traveling speed exceeds the threshold, the processor 11 may determine that the pressure control condition is satisfied and perform the process of Steps S310 to S320 described below.

The control unit 10 may control the pressure valve so that the industrial vehicle stops when the forward/reverse lever 20 is not switched to the neutral state or the traveling speed of the industrial vehicle is equal to or less than the threshold (S230).

The processor 11 may determine that the pressure control condition is not satisfied when the forward/reverse lever 20 is not in the neutral state and/or the traveling speed is equal to or less than the threshold, and perform stop control. In order to perform the stop control, the processor 11 may apply a current corresponding to the pressure for stopping the industrial vehicle to the pressure valve based on the traveling speed.

Meanwhile, as illustrated in FIG. 4, when the control unit 10 determines that the pressure control condition is satisfied, the control unit 10 may identify the load capacity of the cargo loaded on the industrial vehicle. When the load capacity is identified, the control unit 10 may perform current proportional-integral-derivative control (current PID control) for the pressure valve based on the load capacity of the cargo loaded on the industrial vehicle and the proportional gain for each preset load capacity range (S310). Here, the pressure valve may be the EPPR Valve 31.

In the current PID control, the proportional gain may be a proportional increase value, which is the rate at which the output value is adjusted in proportion to the size of the error, and an I gain may be the rate at which the output value is adjusted in proportion to the accumulation of error over time, and a D gain may be the rate that predicts the error and adjusts rapid changes or overshoot.

The processor 11 may identify a load corresponding to the load capacity based on the load signal when the pressure control condition is satisfied. When the load is identified, the processor 11 may set the proportional gain, the I gain, and/or the D gain matching the identified load according to preset criteria, and output the control command signal for current PID control to the pressure valve. For example, referring to FIG. 6, the proportional gain may be set to 0.5 in a section where the rated load identified according to the load signal corresponding to the load capacity is 9% or less, 0.4 in a section where the rated load is 10% to 50%, 0.3 in a section where the rated load is 51% to 90%, and 0.2 in a section where the rated load is 91% or more. Therefore, the proportional gain may be set inversely proportional to the load capacity.

When the pressure control condition is satisfied but the load capacity of the cargo loaded on the industrial vehicle is not identified, the control unit 10 may control the pressure valve without changing the settings for each of the proportional gain, the I gain, and/or the D gain.

When the processor 11 does not receive the load signal or the load is not identified, the process of Step S310 may not be performed and the current PID control may be performed by the preset proportional gain, I gain, and/or D gain. After controlling the pressure valve through the current PID control, the processor 11 may perform a process for determining whether preset deceleration conditions are satisfied.

The control unit 10 may determine whether the preset deceleration condition is satisfied after controlling the pressure valve. At this time, when it is determined that the deceleration condition is not satisfied, the pressure valve may be controlled so that the industrial vehicle stops (S330).

After controlling the pressure valve, the processor 11 may determine that the deceleration condition is satisfied when the current vehicle speed is equal to or more than a preset reference value based on the speed signal. When the current vehicle speed is lower than the preset reference value, the processor 11 may determine that the deceleration condition is not satisfied and output a control command signal to the valve drive unit 30 so that the industrial vehicle stops. For example, the reference value may be 2 km/h.

When it is determined that the deceleration condition is satisfied, the control unit 10 may control the pressure provided to the brake device through the pressure valve to perform deceleration traveling of the industrial vehicle (S320), and finally stop the industrial vehicle (S330).

The processor 11 may control the pressure valve so that the current vehicle speed is decelerated by a preset deceleration value when the current vehicle speed is equal to or more than the reference value. For example, the deceleration value may be 2 km/h. Based on the speed signal, the processor 11 may output the control command signal to the valve drive unit 30 so that the industrial vehicle stops after the deceleration is performed.

When the vehicle speed is equal to or more than the reference value after the current PID control of the pressure valve, there is a risk of shock due to sudden stop when the industrial vehicle is attempted to stop. For the vehicle speed exceeding the reference value, stable stopping is possible by performing deceleration control and then stopping the industrial vehicle. Therefore, the industrial vehicle safety system of the present disclosure may perform a stable stop by causing the industrial vehicle to stop when the traveling speed of the industrial vehicle is less than the reference value and causing the industrial vehicle to stop after decelerating based on a deceleration value when the traveling speed of the industrial vehicle is equal to or more than the reference value.

Meanwhile, the control unit 10 may perform the current control for the pressure valve based on at least one control section of a first section corresponding to stop control, a second section corresponding to deceleration, and a third section corresponding to non-control, which are preset according to the current and pressure ranges.

For example, referring to FIG. 5, the processor 11 may control, based on the first section, to apply a current of 199 mA or less to the pressure valve and provide a pressure of 3.4 bar or less to the brake device for stopping the vehicle. While performing deceleration of the vehicle speed, the processor 11 may control, based on the second section, to apply a current of 200 mA to 600 mA to the pressure valve and provide a pressure of 3.5 bar to 5.5 bar to the brake device. While not performing deceleration and/or stopping of the vehicle speed, the processor 11 may control, based on the third section, to apply a current of 601 mA or more to the pressure valve and provide a pressure of 5.6 bar or more to the brake device.

The above-described specification may be implemented as a computer-readable code on a medium in which a program is recorded. The computer-readable medium may include all kinds of recording devices that store data that may be read by a computer system. Examples of the computer-readable medium include a hard disk drive HDD, a solid state disk SSD, a silicon disk drive SDD, a ROM, a RAM, a CD-ROM, a magnetic tape, a floppy disk, an optical data storage device, and may also include a medium implemented in the form of a carrier wave (for example, transmission via the Internet). Therefore, the above detailed description should not be construed as limiting in all aspects and should be considered as illustrative. The scope of the present specification should be determined by a reasonable interpretation of the appended claims, and all changes within the equivalency range of the present specification are included in the scope of the present specification.

In addition, although the above description has been made focusing on the embodiments, these are merely examples and do not limit the present specification, and those with ordinary knowledge in the field to which this specification pertains will recognize that various modifications and applications not exemplified above are possible without departing from the essential characteristics of the present embodiment. For example, each component specifically illustrated in the embodiments may be modified and implemented. Moreover, the differences related to such modifications and applications should be interpreted as being included in the scope of the present specification defined in the appended claims.

What is claimed is:

1. An industrial vehicle safety system comprising:

a sensor module that senses or detects at least one of a traveling speed, a load capacity, and whether a driver has left his/her seat of an industrial vehicle;

a forward/reverse lever of the industrial vehicle operated by the driver;

a pressure valve that controls hydraulic pressure provided to a brake device of the industrial vehicle in response to operation of the forward/reverse lever; and a control unit that controls the pressure valve based on a signal output from the sensor module and the operation of the forward/reverse lever, wherein the control unit switches the forward/reverse lever to a neutral state when it is confirmed that the driver has left his/her seat based on the signal output from the sensor module and monitors the traveling speed of the industrial vehicle, determines whether a preset pressure control condition is satisfied based on the traveling speed of the industrial vehicle, and adjusts pressure provided to the brake device through the pressure valve based on at least one of a load capacity of cargo loaded on the industrial vehicle and a preset deceleration condition to perform deceleration traveling of the industrial vehicle when it is determined that the pressure control condition is satisfied.

2. The industrial vehicle safety system according to claim 1, wherein the pressure valve is an electro-hydraulic proportional pressure reducing valve (EPPR valve).

3. The industrial vehicle safety system according to claim 2, wherein the control unit, determines that the pressure control condition is satisfied when the traveling speed of the industrial vehicle exceeds a threshold, and performs current control for the pressure valve based on at least one control section of a first section corresponding to stop control, a second section corresponding to deceleration, and a third section corresponding to non-control, which are preset according to a current and pressure range, and monitors the current input to the pressure valve and a vehicle speed of the industrial vehicle.

4. The industrial vehicle safety system according to claim 3, wherein when the load capacity of the cargo loaded on the industrial vehicle is identified based on the output of the sensor module in a case of performing the current control for the pressure valve, the control unit performs current proportional-integral-derivative control (current PID control) for the pressure valve based on the load capacity of the cargo loaded on the industrial vehicle and a proportional gain for each preset load capacity range.

5. The industrial vehicle safety system according to claim 3, wherein the control unit controls the pressure valve so that the industrial vehicle stops when the traveling speed of the industrial vehicle is less than a preset reference value and controls the pressure valve so that the industrial vehicle stops after decelerating based on a preset deceleration value when the traveling speed of the industrial vehicle is equal to or more than the reference value.

6. The industrial vehicle safety system according to claim 1, wherein the control unit controls the pressure valve so that the industrial vehicle stops when the forward/reverse lever is not switched to a neutral state or the traveling speed of the industrial vehicle is equal to or less than a threshold.

7. The industrial vehicle safety system according to claim 1, wherein the sensor module includes a speed sensor that senses or detects the traveling speed of the industrial vehicle, a weight measurement sensor that senses or detects the load capacity of the industrial vehicle, a seat switch that detects whether the driver is seated, and a seat belt switch that detects whether the driver is wearing a seat belt, and the control unit confirms whether the driver has left his/her seat based on a signal output from the seat switch and a signal output from the seat belt switch.

8. A control method of an industrial vehicle safety system including a sensor module that senses or detects at least one of a traveling speed, a load capacity, and whether a driver has left his/her seat of an industrial vehicle, a forward/reverse lever of the industrial vehicle operated by the driver, a pressure valve that controls hydraulic pressure provided to a brake device of the industrial vehicle in response to operation of the forward/reverse lever, and a control unit that controls the pressure valve based on a signal output from the sensor module and the operation of the forward/reverse lever, the control method comprising:

receiving a signal output from the sensor module;

switching the forward/reverse lever to a neutral state when it is confirmed that the driver has left his/her seat based on the signal output from the sensor module and monitors the traveling speed of the industrial vehicle;

determining whether a preset pressure control condition is satisfied based on the traveling speed of the industrial vehicle; and adjusting pressure provided to the brake device through the pressure valve based on at least one of a load capacity of cargo loaded on the industrial vehicle and a preset deceleration condition to perform deceleration traveling of the industrial vehicle when it is determined that the pressure control condition is satisfied.

9. The control method according to claim 8, wherein the pressure valve is an electro-hydraulic proportional pressure reducing valve (EPPR valve), and the determining of whether the pressure control condition is satisfied includes determining that the pressure control condition is not satisfied when the forward/reverse lever is not switched to a neutral state or the traveling speed of the industrial vehicle is equal to or less than a threshold and controlling the pressure valve so that the industrial vehicle stops, and determining that the pressure control condition is satisfied when the traveling speed of the industrial vehicle exceeds the threshold, and the performing of deceleration traveling of the industrial vehicle based on the deceleration condition includes controlling the pressure valve so that the industrial vehicle stops based on a control section of a preset current-pressure range for stop control when the traveling speed of the industrial vehicle is less than a preset reference value, performing current control for the pressure valve so that the industrial vehicle decelerates and then stops based on a control section of a preset current-pressure range for each of stop control, deceleration control, and non-control, and a preset deceleration value when the traveling speed of the industrial vehicle is equal to or more than the reference value, and monitoring the current input to the pressure valve and the vehicle speed of the industrial vehicle.

10. The control method according to claim 9, wherein the performing of the current control for the pressure value includes, when the load capacity of the cargo loaded on the industrial vehicle is identified based on the output of the sensor module, performing current proportional-integral-derivative control (current PID control) for the pressure valve based on the load capacity of the cargo loaded on the industrial vehicle and a proportional gain for each preset load capacity range.

* * * * *